(12) United States Patent
Wang (10) Patent No.: US 11,224,027 B2
(45) Date of Patent: Jan. 11, 2022

(54) CELL REGISTRATION METHOD AND DEVICE

(71) Applicant: GUANGDONG OPPO MOBILE TELECOMMUNICATIONS CORP., LTD., Guangdong (CN)

(72) Inventor: Xukang Wang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/503,302

(22) Filed: Jul. 3, 2019

(65) Prior Publication Data

US 2019/0327702 A1 Oct. 24, 2019

Related U.S. Application Data

(63) Continuation of application No. PCT/CN2017/111952, filed on Nov. 20, 2017.

(30) Foreign Application Priority Data

Jan. 5, 2017 (CN) .......................... 201710007282.1

(51) Int. Cl.
*H04W 60/04* (2009.01)
*H04B 17/318* (2015.01)
(Continued)

(52) U.S. Cl.
CPC .......... *H04W 60/04* (2013.01); *H04B 17/318* (2015.01); *H04W 36/0022* (2013.01);
(Continued)

(58) Field of Classification Search
CPC . H04W 36/0022; H04W 36/30; H04W 48/18; H04W 36/0083; H04W 36/00835;
(Continued)

(56) References Cited

U.S. PATENT DOCUMENTS

2013/0331101 A1* 12/2013 Thomas .................. H04W 8/18
455/435.1
2013/0336290 A1 12/2013 Xia
(Continued)

FOREIGN PATENT DOCUMENTS

CN 104365152 A 2/2015
CN 105208611 A 12/2015
(Continued)

OTHER PUBLICATIONS

The extended European search report for the EP patent application No. 17889686.6, dated Dec. 16, 2019.
(Continued)

*Primary Examiner* — Margaret G Mastrodonato
(74) *Attorney, Agent, or Firm* — Ladas & Parry, LLP (57) ABSTRACT

Disclosed are a cell registration method and device. The method may include: when receiving a paging message of a Circuit Switched FallBack (CSFB), System Information (SI3) of a first cell is acquired, the SI3 including a first signal strength threshold of the first cell which a terminal device resides; the first cell is registered when a current signal strength of the first cell is less than the first signal strength threshold and greater than a preset cell resident signal strength threshold of the terminal device. The present disclosure can solve the problem that the Mobile Terminated call may fail in an environment where the network signal is weak, and improve the user communication experience.

20 Claims, 5 Drawing Sheets

(51) Int. Cl.
*H04W 76/16* (2018.01)
*H04W 36/00* (2009.01)
*H04W 68/02* (2009.01)

(52) U.S. Cl.
CPC ..... *H04W 36/00835* (2018.08); *H04W 68/02* (2013.01); *H04W 76/16* (2018.02)

(58) Field of Classification Search
CPC ..... H04W 60/04; H04W 68/02; H04W 76/16; H04B 17/318
See application file for complete search history.

(56) References Cited

U.S. PATENT DOCUMENTS

| | | | |
|---|---|---|---|
| 2014/0162632 A1* | 6/2014 | Gajula | H04W 24/02 455/426.1 |
| 2015/0163701 A1 | 6/2015 | Yenamandra et al. | |
| 2015/0208285 A1 | 7/2015 | Liao et al. | |
| 2016/0353330 A1 | 12/2016 | Naik et al. | |

FOREIGN PATENT DOCUMENTS

| | | |
|---|---|---|
| CN | 105813128 A | 7/2016 |
| CN | 106714250 A | 5/2017 |
| CN | 106851754 A | 6/2017 |
| KR | 20150008283 A | 1/2015 |

OTHER PUBLICATIONS

International Search Report of PCT/CN2017/111952, dated Feb. 22, 2018. (2 pages).
Written Opinion of the International Searching Authority of PCT/CN2017/111952, dated Feb. 22, 2018.
The First examination report for the IN patent application No. 201917031534, dated Oct. 27, 2020.

* cited by examiner

CELL REGISTRATION METHOD AND DEVICE

CROSS-REFERENCE TO RELATED APPLICATIONS

This application is a continuation of International Application No. PCT/CN2017/111952, filed on Nov. 20, 2017, which claims priority to Chinese Patent Application No. 201710007282.1, filed on Jan. 5, 2017, the disclosures of which are hereby incorporated by reference.

TECHNICAL FIELD

The present disclosure relates to the field of electronic technologies, and in particular, to a cell registration method and device.

BACKGROUND

Circuit Switched FallBack (CSFB) is a communication technology for providing voice services based on a circuit switched network (LTE voice solution in 3GPP standard), and is one of the consequences of CS over PS research in 3GPP R8. The background proposed by the research is that a wireless component of the dual-mode terminal with a Long Term Evolution (LTE) and a Circuit Switched (CS) domain is of a single wireless mode. That is, a dual-mode or multi-mode terminal with the LTE and the UTRAN/GERAN access capability cannot receive/send a circuit domain service signal when using the LTE access. In order to enable a terminal device to initiate a CS service such as a voice service and receive a paging message of a CS service such as a voice under LTE access, and to correctly process a Packet Switched (PS) domain service being performed by the terminal in an LTE network, a CSFB technology is generated.

That is, when User Equipment (UE) is in an LTE network, the UE merely only use a voice service in the PS domain, that is, an IP Multimedia Subsystem Voice (IMS Voice) service. However, the existing LTE network does not necessarily support the IMS Voice service, or the UE does not have the capability of the IMS Voice service, and therefore the UE may need to be re-accessed to the Second Generation (2G) Mobile Communication Technology network or the Third Generation (3G) Mobile Communication Technology network to use the voice service in the CS domain. However, in some scenarios of weaker network signals in the prior art, there may be a problem that a Mobile Terminated (MT) call fails when the terminal device falls back from the LTE network to the 2G Mobile Communication Technology network, thus resulting that the user cannot perform normal communication and the user experience is poor.

SUMMARY

Embodiments of the present disclosure provide a cell registration method and device, which can solve the problem in the related art that an MT call may fail in an environment where a network signal is weak.

According to a first aspect, an embodiment of the present disclosure provides a cell registration method, which may include:

when receiving a paging message of a Circuit Switched FallBack (CSFB), acquiring System Information (SI3) of a first cell, the SI3 including a first signal strength threshold of the first cell which a terminal device resides;

registering to the first cell when a current signal strength of the first cell is less than the first signal strength threshold and greater than a preset cell resident signal strength threshold of the terminal device.

According to a second aspect, an embodiment of the present disclosure provides a cell registration device, which may include:

a first acquiring component, configured to acquire System Information (SI3) of a first cell when a paging message of a Circuit Switched FallBack (CSFB) is received, the SI3 including a first signal strength threshold of the first cell which a terminal device resides;

a first registering component, configured to register to the first cell when a current signal strength of the first cell is less than the first signal strength threshold and greater than a preset cell resident signal strength threshold of the terminal device.

According to a third aspect, an embodiment of the present disclosure provides a terminal device, which may include:

a memory storing at least one executable program code;

a processor coupled with the memory;

wherein the processor is configured to call the at least one executable program code stored in the memory to execute a part or all of the blocks as described in any one of methods of the first aspect of the embodiment of the present disclosure.

According to a fourth aspect, the present disclosure provides a computer storage medium, wherein the computer storage medium is configured to store at least one computer software instruction for a cell registration device provided in the second aspect of the embodiment of the present disclosure, which includes a program configured to execute the above aspect.

According to a fifth aspect, an embodiment of the present disclosure provides a computer program product, where the computer program product includes a non-volatile computer readable storage medium storing at least one computer program, and the at least one computer program is operable to cause a computer to perform a part or all of the blocks as described in the first aspect of the embodiment of the present disclosure. The at least one computer program product may be a software installation package, and the computer includes a terminal device.

The embodiments of the present disclosure have the following beneficial effects:

In the embodiment of the present disclosure, System Information (SI3) of a first cell is acquired when receiving a paging message of a Circuit Switched FallBack (CSFB), where the SI3 includes a first signal strength threshold of the first cell which the terminal device resides; the first cell is registered when a current signal strength of the first cell is less than the first signal strength threshold and greater than a preset cell resident signal strength threshold of the terminal device. Namely, in the present disclosure, when the terminal device needs to perform the CSFB, and the current signal strength of the cell needs to be registered is weak, and does not reach the minimum resident signal strength condition of the cell, whether the current signal strength of the cell is greater than a preset cell resident signal strength threshold that the terminal device is able to perform network registration is further judged, and when a judgment result is that the current signal strength is greater than the preset cell resident signal strength threshold, the cell registration failure can be avoided in the case that the signal strength of the cell is weak but the terminal device is able to register to a cell. The problem that the Mobile Terminated (MT) may fail in an environment where the network signal is weak is solved, and the user communication experience is improved.

BRIEF DESCRIPTION OF THE DRAWINGS

In order to describe the technical solutions in the embodiments of the present disclosure or in the related art more clearly, the accompanying drawings required for describing the embodiments or the related art are briefly introduced below, and obviously, the accompanying drawings in the following description are merely some embodiments of the present disclosure, and for a person of ordinary skill in the art, Other drawings can also be obtained from these drawings without creative efforts.

DETAILED DESCRIPTION OF THE EMBODIMENTS

In order to make those skilled in the art better understand the solutions of the present disclosure, the technical solutions in the embodiments of the present disclosure will be clearly and completely described below with reference to the accompanying drawings in the embodiments of the present disclosure. Apparently, the described embodiments are merely a part of the embodiments of the present disclosure, rather than all of the embodiments. Based on the embodiments in the present disclosure, all other embodiments obtained by those skilled in the art without creative efforts should fall within the scope of protection of the present disclosure.

Detailed description is given below.

The terms "first," "second," "third," and "fourth," etc. in the description and claims of the present disclosure and the accompanying drawings, are used to distinguish different objects rather than to describe a specific order. Moreover, the terms "comprising" and "having" and any variations thereof, are intended to cover an exclusive inclusion. For example, a process, method, system, product or apparatus comprising a series of blocks or elements is not limited to the blocks or elements already listed, but alternatively also comprises blocks or units not listed, or alternatively further comprises other blocks or elements inherent to the processes, methods, products or apparatuses.

Reference herein to 'an embodiment' means that a particular feature, structure, or characteristic described in connection with the embodiment may be included in at least one embodiment of the present disclosure. The appearance of this phrase at various locations in the specification does not necessarily mean the same embodiment, nor is an independent or alternative embodiment that is mutually exclusive to other embodiments. It is expressly and implicitly understood by those skilled in the art that the embodiments described herein may be combined with other embodiments.

Hereinafter, some terms in the present disclosure is explained to facilitate understanding by those skilled in the art.

1). A terminal device, also referred to as User Equipment (UE), is a device for providing voice and/or data connectivity to a user, such as a hand held device having a wireless connection function, a vehicle-mounted device, and the like. Common terminal devices include, for example: a mobile phone, a tablet computer, a notebook computer, a palmtop computer, and a Mobile Internet Device (MID), a wearable device, a smart bracelet, a pedometer, an MP3 player (Moving Picture Experts Group Audio Layer III), an MP4 (Moving Picture Experts Group Audio Layer IV) player, a Personal Digital Assistant (PDA), a laptop computer, and the like.

2) Global System for Mobile Communication (GSM) is the most extensive standard of mobile telephone currently applied. Exceeding 200 countries and zones over 100 billion people are using GSM telephones. The absence of the GSM standard makes the user's international roaming very common after signing a "roaming agreement" between mobile phone operators. The difference in GSM over its previous standard is that its signaling and voice channels are both digital, so the GSM is regarded as a second generation (2G) mobile telephone system. This illustrates that digital communications have been built into the system from an early time. The GSM is an open standard currently developed by 3GPP.

3), "a plurality" means two or more. "and/or" describes the association relationships of the association objects, indicating that there may be three relationships, for example, A and/or B, which may represent: there are A alone, A and B together, and B alone. The character '/' generally indicates that the front and back associated objects are a 'or' relationship.

Figure 1:
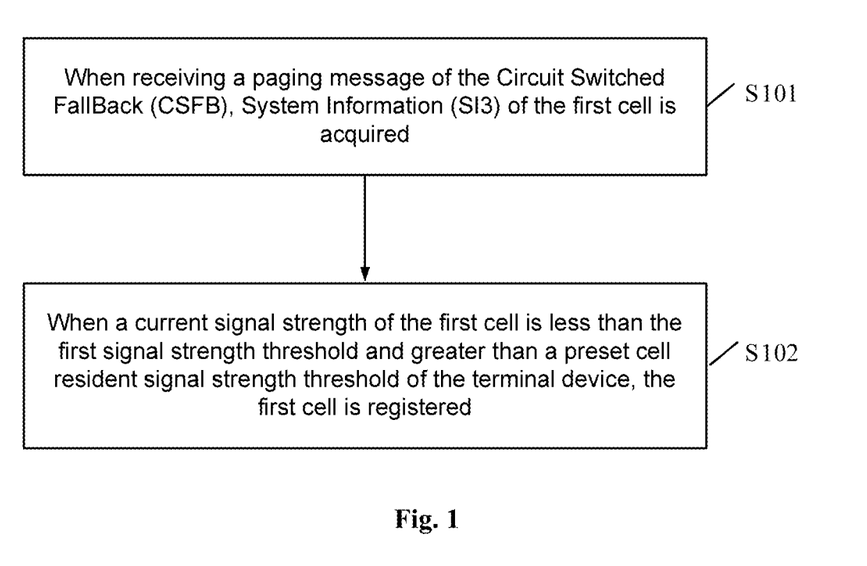
FIG. 1 is a schematic flowchart of a cell registration method according to an embodiment of the present disclosure.

FIG. 1 is a schematic flowchart of a cell registration method according to an embodiment of the present disclosure, and a cell registration method according to an embodiment of the present disclosure will be described in detail below from a terminal device side in conjunction with FIG. 1. The method includes the following blocks S101 to S103.

Block S101: when receiving a paging message of a Circuit Switched FallBack (CSFB), System Information (SI3) of a first cell is acquired, the SI3 including a first signal strength threshold of the first cell which a terminal device resides;

As at least one alternative embodiment, when receiving the paging message (paging) of the Circuit Switched FallBack (CSFB) sent by the core network side, the terminal device, or the relevant processor or the relevant processing component (which will be described later) in the terminal device receives a frequency point specified by an LTE (for example, 4G) redirected from 4G to 2G, for example, a frequency point specified by an eNode, initiates a power scan at the frequency point, and acquires System Information (SI3) of a first cell that needs to be accessed currently. The SI3 includes a minimum access signal strength value (that is, a first signal strength threshold) required by the terminal device to reside in the first cell. For the specific meaning and definition of SI3, reference may be made to the provisions of the GSM protocol, and for details, reference may be made to the provisions in 3GPP TS 44.018. It can be understood that, after the terminal device initiates the power scan, information about a plurality of cells is scanned. That is, received signal strengths of a plurality of cells may be received. Optionally, the first cell may be a cell with the strongest signal strength, among the plurality of cells, or a cell that needs to be resided by selecting according to other calculation algorithms, which is not specifically limited in the present disclosure.

Block S102: the first cell is registered when a current signal strength of the first cell is less than the first signal strength threshold and greater than a preset cell resident signal strength threshold of the terminal device.

As at least one alternative embodiment, in the related art, when it is determined that the current signal strength of the first cell is less than the first signal strength threshold, that is, when it is judged that the signal strength of the first cell (the current signal strength of the first cell) received by the terminal device is less than the first signal strength threshold carried in the SI, it is determined that the terminal device does not satisfy the most basic cell resident condition, that is, the terminal device is not able to reside in the first cell normally. However, each terminal device virtually has a minimum signal strength which is able to be accessed and reside in a cell. That is, the terminal device can register to the cell as long as the signal strength of the cell received by the terminal is greater than the minimum signal strength. There is merely a problem of poor communication conditions due to weaker network signals, but at least normal communication may be performed. For example, when the current signal strength of the cell is less than the minimum signal strength resident condition of the cell, but the minimum resident condition of the terminal device is satisfied, that is, in this case, by adopting the embodiment of the present disclosure, the first signal strength threshold may be ignored, and the first cell still continues to be registered for communication when the signal strength is greater than the preset cell resident signal strength threshold. Therefore, as long as the condition in this block is satisfied, the terminal device is controlled to continue the registration of the first cell to perform the subsequent communication process.

In a possible implementation, the preset cell resident signal strength threshold of the terminal device may be a factory setting performed by a technician before the terminal device is delivered, or may be a flexibly changed value obtained according to the resident information of the historical cell combined with the relevant algorithm during use, when the terminal device is being used, which is not specifically limited by the present disclosure.

In one possible implementation, the terminal device may further initiate the Mobile Terminated (MT) call through the first cell with successful registration.

In the embodiment of the present disclosure, System Information (SI3) of a first cell is acquired when receiving a paging message of a Circuit Switched FallBack (CSFB), wherein the SI3 includes a first signal strength threshold of the first cell which the terminal device resides; the first cell is registered when the current signal strength of the first cell is less than the first signal strength threshold and greater than a preset cell resident signal strength threshold of the terminal device. Namely, in the present disclosure, when the terminal device need to perform the CSFB, and the current signal strength of the cell needs to be registered is weak and does not reach the minimum resident signal strength condition of the cell, whether the current signal strength of the cell is greater than a preset cell resident signal strength threshold that the terminal device is able to perform network registration is further judged. When the judgment result is that the current signal strength is greater than the preset cell resident signal strength threshold, the cell registration failure may be avoided in the case that the signal strength of the cell is weak but the terminal device is able to register to the cell. The problem that the Mobile Terminated (MT) call may fail in an environment where the network signal is weak is solved, and the user communication experience is improved.

Figure 2:
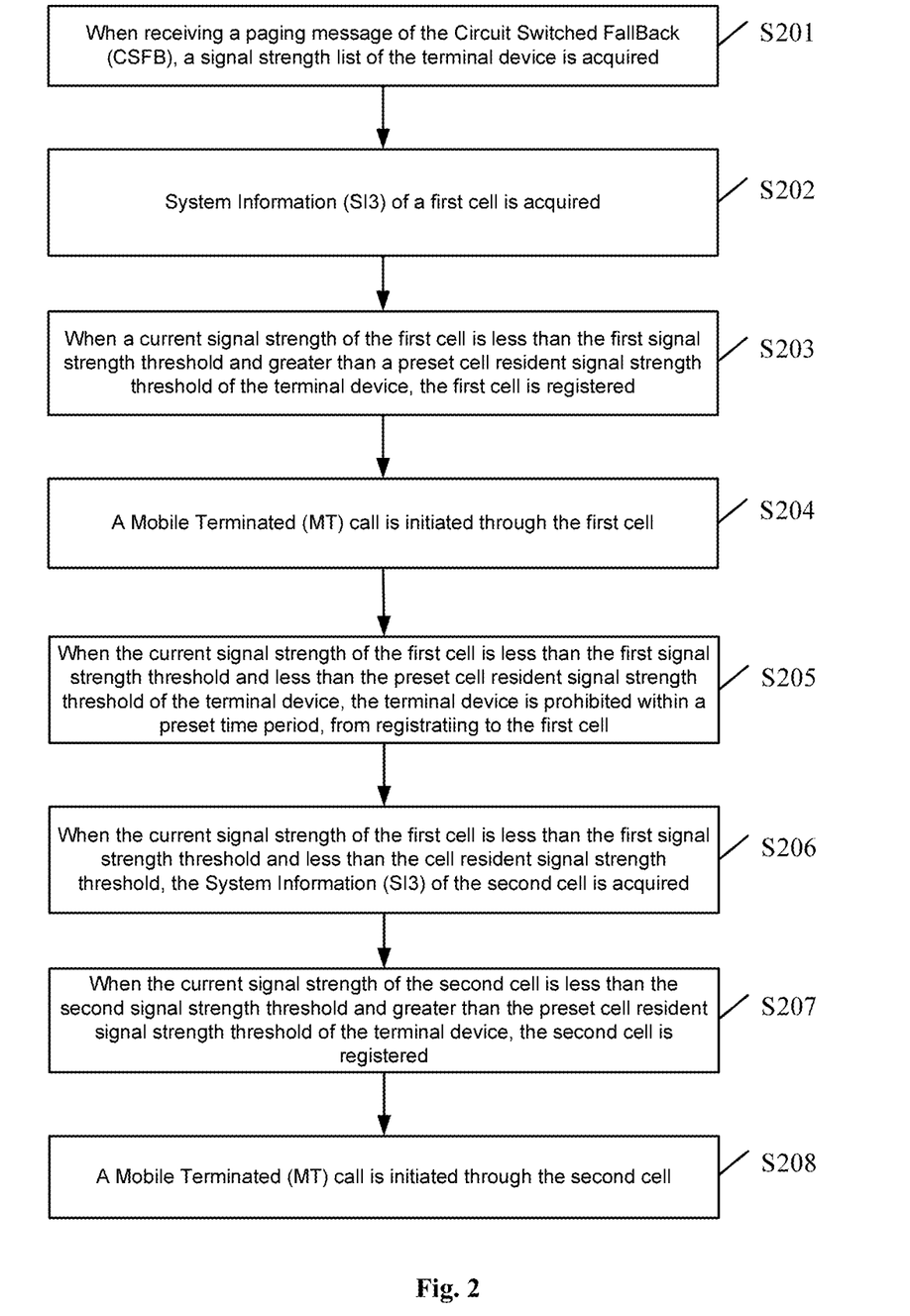
FIG. 2 is a schematic flowchart of another cell registration method according to an embodiment of the present disclosure.

FIG. 2 is a schematic flowchart of another cell registration method according to an embodiment of the present disclosure, and another cell registration method in an embodiment of the present disclosure will be described in detail below from a terminal device side in conjunction with FIG. 2. As shown in FIG. 2, the method may include the following blocks S201 to S208.

Block S201: when receiving a paging message of a Circuit Switched FallBack (CSFB), a signal strength list of the terminal device is acquired, wherein the signal strength list includes a current signal strength of the first cell, and the current signal strength of the first cell is the maximum current signal strength in the signal strength list.

As at least one alternative embodiment, when receiving the paging message of the Circuit Switched FallBack (CSFB), the terminal device acquires the signal strength list of the terminal device through a power scan, where the signal strength list includes the signal strength of the cell that the terminal device is able to detect and receive. That is, the signal strength list includes the current signal strength of the first cell, and the terminal device may select the first cell with the strongest current signal strength from the signal strength list to perform attempt registration, that is, the system information of the first cell needs to be firstly acquired.

Block S202: System Information (SI3) of the first cell is acquired, where the SI3 includes a first signal strength threshold of the first cell which the terminal device resides.

Block S203: the first cell is registered when the current signal strength of the first cell is less than the first signal strength threshold and greater than a preset cell resident signal strength threshold of the terminal device.

As at least one alternative embodiment, Block S202 to Block S203 may be shown by referring to the Block S101 to Block S102 in the embodiment shown in FIG. 1, and details are not described herein again.

Block S204: a Mobile Terminated (MT) call is initiated through the first cell.

As at least one alternative embodiment, after the first cell is successfully registered, the MT call may be normally performed through the first cell.

Block S205: when the current signal strength of the first cell is less than the first signal strength threshold and less than a preset cell resident signal strength threshold of the terminal device, the terminal device is prohibited within a preset time period, from registering to the first cell.

As at least one alternative embodiment, when the terminal device determines that the current signal strength of the first cell is less than the first signal strength threshold and is less than the preset cell resident signal strength threshold of the terminal device, that is, neither the resident condition of the first cell nor the lowest signal strength registration condition of the terminal device is satisfied, the terminal device is prohibited within the preset time period, from registering to the first cell. Assuming that the preset time period is the time period between the first time point and the second time point, the specific implementation may be that the cell identifier of the first cell is added into the registration forbidden cell list of the terminal device at the first time point, and the cell identifier of the first cell is removed from the registration forbidden cell list at the second time point.

That is, when the terminal device needs to perform re-registration within a preset time period, as long as it is detected that the cell identifier of the cell is stored in the registration forbidden cell list, the terminal device will not acquire the System Information of the cell within the preset time period nor initiate the network registration, so as to save network resources and unnecessary network overhead.

It can be understood that the present disclosure does not specifically define the preset time period, and may be a shorter time or a longer time or an infinite long time.

Block S206: when the current signal strength of the first cell is less than the first signal strength threshold and less than the preset cell resident signal strength threshold, System Information (SI3) of the second cell is acquired, wherein the SI3 of the second cell includes a second signal strength threshold for the terminal device residing in the second cell, and the current signal strength of the first cell is greater than the current signal strength of the second cell.

As at least one alternative embodiment, when it is determined that the terminal device is not able to reside in the first cell or is not possible to reside in the first cell, the terminal device needs to change the resident target. In this case, the second cell with the second signal strength may be selected according to the signal strength list of the terminal device in block S201, as to perform the same judgment and operation which are performed on the first cell. That is, the SI3 of the second cell is acquired, and whether the terminal device is able to reside in the second cell is subsequently judged according to the second signal strength threshold of the second cell and the preset cell resident signal strength threshold of the terminal device, wherein the judgment principle is similar to the judgment principle which is performed on the first cell, and will not be repeated here.

Block S207: the second cell is registered when the current signal strength of the second cell is less than the second signal strength threshold and greater than the preset cell resident signal strength threshold of the terminal device.

As at least one alternative embodiment, when the signal strength of the second cell is less than the second signal strength threshold and greater than the preset cell resident signal strength threshold of the terminal device, that is, it indicates that although the resident condition of the second cell is not satisfied, the condition for the terminal device to reside in the cell is satisfied, the registration flow is initiated to the second cell.

Block S208: an MT call is initiated through the second cell.

As at least one alternative embodiment, after the second cell is registered successfully, the MT call is initiated through the second cell. It can be understood that, when the second cell is not able to be resided in, the terminal device may continue to query for other resident cells according to the signal strength list, and the circulation is pushed until the cell is able to be successfully registered for normal communication.

Figure 3:
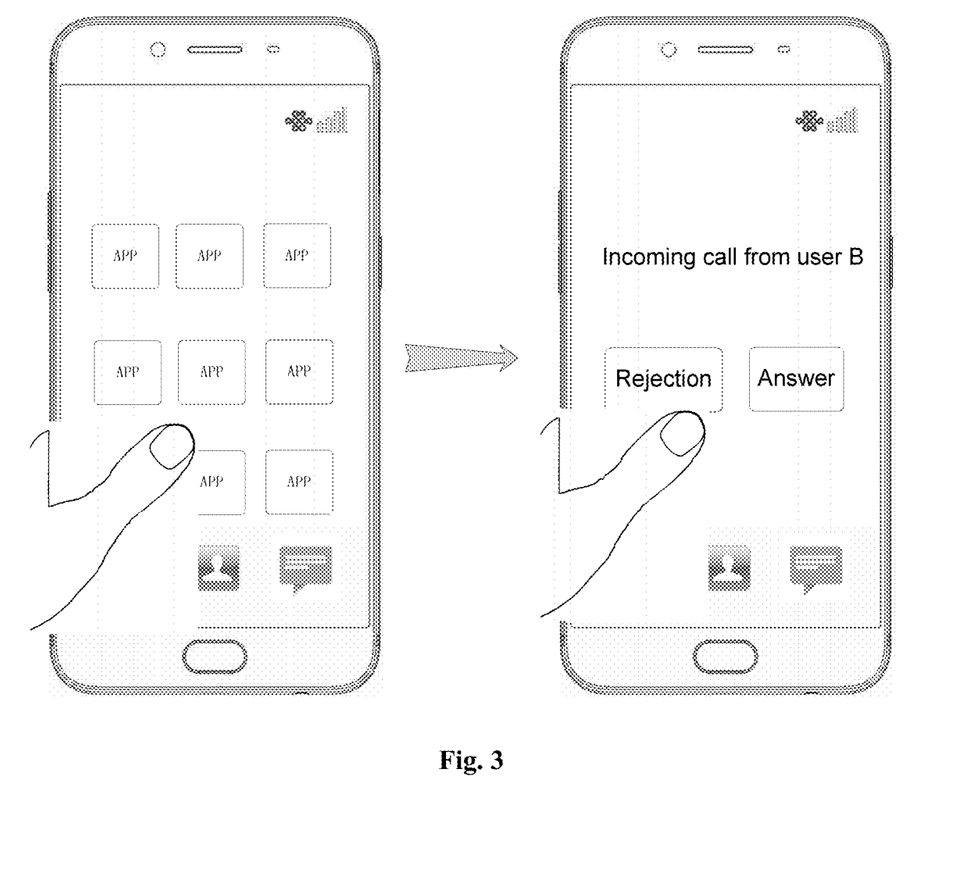
FIG. 3 is a schematic diagram of a specific application scenario of a cell registration method according to an embodiment of the present disclosure.

In a specific application scenario, as shown in FIG. 3, FIG. 3 is a schematic diagram of a specific application scenario of cell registration according to an embodiment of the present disclosure. In the related art, when a terminal device is in a CSFB, a case that a 2G network cannot be registered for telephone answering as shown in FIG. 3 may occur. However, after the embodiments of the present disclosure are applied, an incoming call may be normally received as shown in the right diagram in FIG. 3, and more clearly, reference may be made to the description of the foregoing method embodiments.

In the embodiment of the present disclosure, SI3 of a first cell is acquired when receiving a paging message of a Circuit Switched FallBack (CSFB), where the SI3 includes a first signal strength threshold of the first cell which the terminal device resides; the first cell is registered when the current signal strength of the first cell is less than the first signal strength threshold and greater than a preset cell resident signal strength threshold of the terminal device. Namely, in the present disclosure, when the terminal device needs to performs the CSFB, and the current signal strength of the cell needs to be registered is weak and does not reach the minimum resident signal strength condition of the cell, whether the current signal strength of the cell is greater than a preset cell resident signal strength threshold that the terminal device is able to perform network registration is further judged, and when the judgment result is that the current signal strength is greater than the preset cell resident signal strength threshold, the cell registration failure may be avoided in the case that the signal strength of the cell is weak but the terminal device is able to register to the cell. The problem that the MT call may fail in an environment where the network signal is weak is solved, and the user communication experience is improved.

Figure 4:
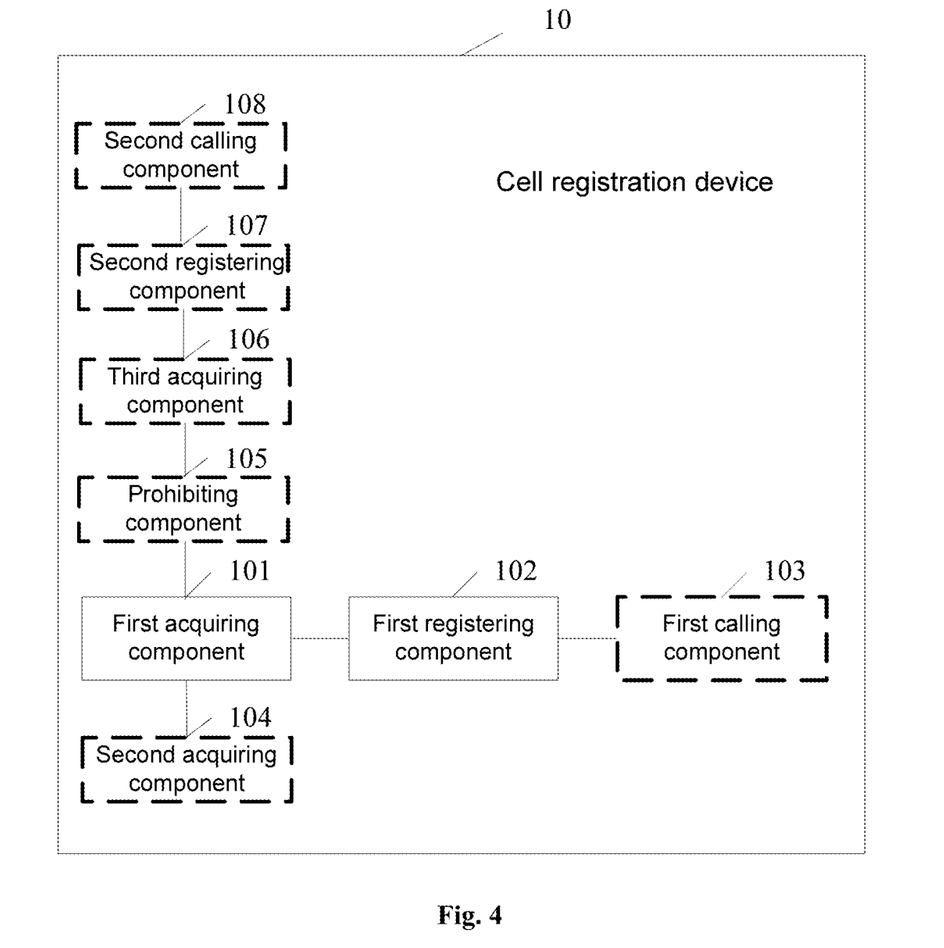
FIG. 4 is a schematic structural diagram of a cell registration device according to an embodiment of the present disclosure.

An embodiment of the present disclosure further provides a cell registration device 10, as shown in FIG. 4, FIG. 4 is a schematic structural diagram of a cell registration device in an embodiment of the present disclosure, and the structure of the cell registration device 10 will be described in detail below with reference to FIG. 4. The cell registration device 10 may include: a first acquiring component 101 and a first registering component 102, wherein a first acquiring component 101, configured to acquire System Information (SI3) of a first cell when a paging message of a Circuit Switched FallBack (CSFB) is received, wherein the SI3 includes a first signal strength threshold of the first cell which the terminal device resides;

The first registering component 102 is configured to register to the first cell when the current signal strength of the first cell is less than the first signal strength threshold and greater than a preset cell resident signal strength threshold of the terminal device.

As at least one alternative embodiment, as shown in the dotted box in FIG. 4, the cell registration device 10 further includes:

The first calling component 103 is configured to initiate a Mobile Terminated (MT) call through the first cell.

Further, the cell registration device 10 further includes:

A second acquiring component 104, configured to acquire a signal strength list of the terminal device, where the signal strength list includes a current signal strength of the first cell, and the current signal strength of the first cell is the maximum current signal strength in the signal strength list.

As at least one alternative embodiment, the second acquiring component 104 is configured to:

acquire a received signal strength corresponding to a cell that is able to be detected by the terminal device through a power scan, and generate the signal strength list of the terminal device according to the received signal strength corresponding to the cell that is able to be detected by the terminal device.

As at least one alternative embodiment, as shown in the dotted box in FIG. 4, the cell registration device 10 further includes:

a prohibiting component 105, configured to prohibit within a preset time period, the terminal device from registering to the first cell when the current signal strength of the first cell is less than the first signal strength threshold and less than a preset cell resident signal strength threshold of the terminal device.

As at least one alternative embodiment, the preset time period is a time period from a first time point to a second time point; the prohibiting component 105 is configured to:

when the current signal strength of the first cell is less than the first signal strength threshold and less than a preset cell resident signal strength threshold of the terminal device, add a cell identifier of the first cell to a registration forbidden cell list of the terminal device at the first time point; and remove the cell identifier of the first cell from the registration forbidden cell list at the second time point.

As at least one alternative embodiment, as shown in the dotted box in FIG. 4, the cell registration device 10 further includes:

a third acquiring component 106, configured to acquire System Information (SI3) of a second cell when the current signal strength of the first cell is less than the first signal strength threshold and less than the preset cell resident signal strength threshold, wherein the SI3 of the second cell comprises a second signal strength threshold of the second cell which the terminal device resides, and the current signal strength of the first cell is greater than the current signal strength of the second cell;

a second registering component 107, configured to register to the second cell when the current signal strength of the second cell is less than the second signal strength threshold and greater than the preset cell resident signal strength threshold of the terminal device.

As at least one alternative embodiment, as shown in the dotted box in FIG. 4, the cell registration device 10 further includes:

The second calling component 108 is configured to initiate a Mobile Terminated (MT) call through the second cell.

As at least one alternative embodiment, the preset cell resident signal strength threshold is a factory setting value, or is a value calculated according to the historical cell resident information of the preset cell.

It can be understood that, the functions of the components in the cell registration device 10 may correspond to the specific implementations in the method embodiments in FIG. 1 to FIG. 3, and details are not described herein again.

In the present embodiment, the cell registration device 10 is presented in the form of a component. The 'component' herein may refer to an application-specific integrated circuit (ASIC), a processor and memory executing one or more software or firmware programs, an integrated logic circuit, and/or other devices that may provide the above-described functionality. In addition, the first registering component 102 may be implemented by the processor 201 of the terminal device shown in FIG. 6.

Figure 5:
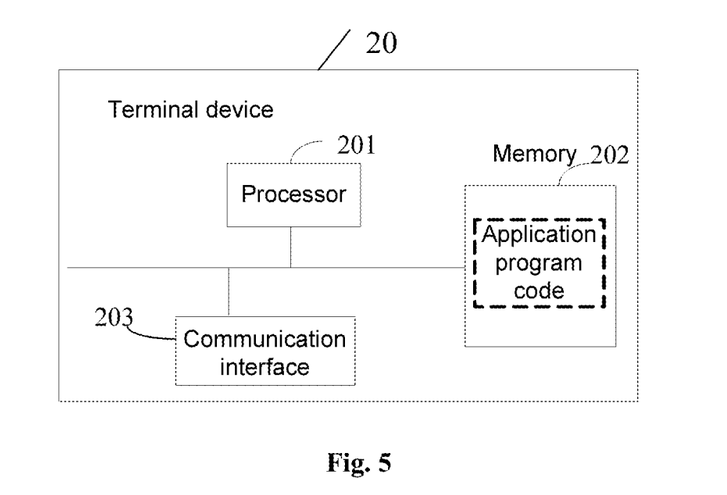
FIG. 5 is a schematic structural diagram of a terminal device according to an embodiment of the present disclosure.

An embodiment of the present disclosure further provides a terminal device 20, as shown in FIG. 5, which is a schematic structural diagram of a terminal device in an embodiment of the present disclosure, and the structure of the terminal device 20 will be described in detail below with reference to FIG. 5. The terminal device 20 includes at least one processor 201, at least one memory 202, and at least one communication interface 203. The processor 201, the memory 202 and the communication interface 203 are connected through the communication bus and communicate with each other.

The processor 201 may be a common Central Processing Unit (CPU), a microprocessor, an application-specific integrated circuit (ASIC), or one or more integrated circuits for controlling the execution of the programs in the above schemes.

The communication interface 203 is configured to communicate with other devices or communication networks such as Ethernet, Radio Access Network (RAN), Wireless Local Area Networks (WLAN), etc.

The memory 202 may be a read-only memory (ROM) or other type of static storage device that may store static information and instructions, a Random Access Memory (RAM) or other types of dynamic storage devices that may store information and instructions, and may also be an Electrically Erasable Programmable Read-Only Memory (EEPROM), Compact Disc Read-Only Memory (CD-ROM) or other optical disk storage, optical disk storage (including compressed disc, laser disc, optical disc, digital versatile disc, blue optical disc, etc.), magnetic disk storage media or other magnetic storage devices, or any other medium that is able to be used to carry or store desired program code in the form of instructions or data structures and that is able to be accessed by a computer. However, the present disclosure is not limited thereto. The memory may be standalone and connected to the processor via a bus. The memory may also be integrated with the processor.

The memory 202 is configured to store application program code for executing the above solution, and the execution is controlled by the processor 201. The processor 201 is configured to execute the application program code stored in the memory 202.

The code stored in the memory 202 may execute the cell registration method of FIG. 1-FIG. 3 performed by the terminal device provided above, for example, when a paging message of a Circuit Switched FallBack (CSFB) is received, System Information (SI3) of a first cell is acquired, where the SI3 includes a first signal strength threshold of the first cell which the terminal device resides; the first cell is registered when the current signal strength of the first cell is less than the first signal strength threshold and greater than a preset cell resident signal strength threshold of the terminal device.

Figure 6:
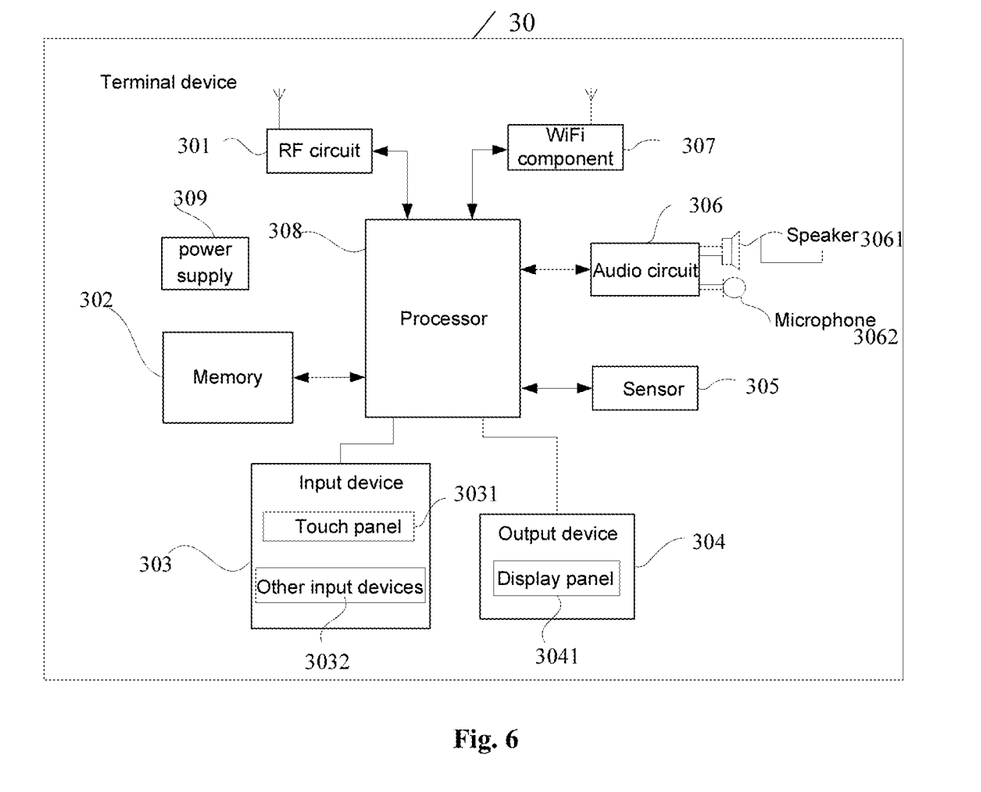
FIG. 6 is a schematic structural diagram of another embodiment of a terminal device according to the present disclosure.

Referring to FIG. 6, FIG. 6 is a schematic structural diagram of another embodiment of a terminal device according to an embodiment of the present disclosure. The terminal device 30 may be an intelligent mobile terminal (such as a mobile phone), and the terminal device 30 includes: a Radio Frequency (English: radio frequency, RF) circuit 301, a memory 302 storing one or more computer programs, an input device 303, a output device 304, a sensor 305, an audio circuit 306, a wireless fidelity (English: Wireless fidelity, Wi-Fi) component 307, a processor 308 including one or more processing cores, a power supply 309, and other components. It will be understood by those skilled in the art that the structure of the terminal device shown in FIG. 6 does not constitute a limitation to the terminal device, and may include more or less components than illustrated, or combine some components, or different arrangements of components.

The RF circuit 301 may be configured to receive and transmit signals during receiving and transmitting a message or calling, in particular, after receiving down link information of a base station, send to one or more processors 308 for processing; in addition, transmit the data relating to the uplink to the base station. In general, the RF circuit 301 includes, but is not limited to, an antenna, at least one amplifier, a tuner, one or more oscillators, a Subscriber Identity Module (SIM) card, a transceiver, a coupler, a Low Noise Amplifier (LNA), a duplexer, etc. In addition, the RF circuit 301 may also communicate with a network or other terminal device through wireless communication. The wireless communication may use any communication standard or protocol including, but not limited to, a Global System of Mobile Communication (GSM), a General Packet Radio Service (GPRS), a Code Division Multiple Access (CDMA), a Wideband Code Division Multiple Access (WCDMA), a Long Term Evolution (LTE), an email, a Short Message Service (SMS), etc.

The memory 302 may be used to store computer programs and modules, and the processor 308 executes various function applications and data processing by running the computer programs and modules stored in the memory 302. The memory 302 may mainly include a storage program area and a storage data area, where the storage program area may store an operating system, an application program (such as a voice playing function, an image playing function, etc.) required by at least one function, and the like; The storage data area may store data (such as photographed photographs, audio data, video data, etc.) created according to the use of the terminal device 30, etc. Moreover, the memory 302 may include high-speed random access memory, and may also include non-volatile memory, such as at least one disk storage device, a flash memory device, or other volatile solid-state storage device. Accordingly, the memory 302 may further include a memory controller to provide access to the memory 302 by the processor 308 and the input device 303.

The input device 303 may be configured to receive input digital or character information, and generate a signal input, of a keyboard, a mouse, joystick, an optical or a trackball, which is related to user settings and function control. In particular, the input device 303 may include a touch-sensitive surface 3031 and other input devices 3032. The touch-sensitive surface 3031, also referred to as a touch display panel or a touch panel, may collect touch operations of a user on or near the touch-sensitive surface 3031 (such as operations of the user on the touch-sensitive surface 3031 or near the touch-sensitive surface 3031 by using any suitable object or accessory such as a finger, a stylus, etc.), and drive a corresponding connection device according to a preset program. Optionally, the touch-sensitive surface 3031 may include two parts of a touch detection device and a touch controller. The touch detection device detects an orientation of the touch of the user, detects a signal brought by the touch operation, and transmits the signal to the touch controller. The touch controller receives the touch information from the touch detection device, converts the received touch information into contact coordinates, and sends the converted contact coordinates to the processor 308, and is able to receive and execute the command sent from the processor 308. Moreover, the touch-sensitive surface 3031 may be realized by various types of resistive, capacitive, infrared, and surface acoustic waves. In addition to the touch-sensitive surface 3031, the input device 303 may also include other input devices 3032. In particular, other input devices 3032 may include, but are not limited to, one or more of a physical keyboard, a function key (such as a volume control key, a switch key, etc.), a trackball, a mouse, a joystick, etc.

The output device 304 may be configured to display information entered by a user or information provided to the user and various graphical user interfaces of the terminal device 30. These graphical user interfaces may include a graphic, a text, a icon, a video, and any combination thereof. The output device 304 may include a display panel 3041, and optionally, the display panel 3041 may be configured by a Liquid Crystal Display (LCD), an Organic Light Emitting Diode (OLED) and the like. Further, the touch-sensitive surface 3031 may cover the display panel 3041. After detecting a touch operation on or near the touch-sensitive surface 3031, the touch-sensitive surface 3031 transmits the touch operation to the processor 308 to determine the type of the touch event, and then the processor 308 provides a corresponding visual output on the display panel 3041 according to the type of the touch event. Although in FIG. 6, the touch-sensitive surface 3031 and the display panel 3041 are used as two separate components to implement input and input functions, in some embodiments, the touch-sensitive surface 3031 may be integrated with the display panel 3041 to implement input and output functions.

The terminal device 30 may also include at least one sensor 305, such as a distance sensor, a light sensor, a motion sensor, and other sensors. As at least one alternative embodiment, the distance sensor is configured to detect a distance between the terminal device screen and an object covering the terminal device, and the light sensor is configured to detect an optical signal of an environment external to the terminal device. As one of the motion sensors, the gravitational acceleration sensor may detect the magnitude of the acceleration in each direction (generally, three axes), and may detect the magnitude and direction of the gravitational force when the terminal device is in a static state, and may be applied for recognizing a posture (such as screen switching between portrait and landscape, related games, magnetometer posture calibration) and related functions such as vibration recognition (such as pedometers, taps) of the terminal device 30. Other sensors, such as a gyroscope, a barometer, a humidity meter, a thermometer, and an infrared sensor, which may be further configured for the terminal device 30, are not described herein again.

The audio circuitry 306, the speaker 3061, and the microphone 3062 may provide an audio interface between the user and the terminal device 30. The audio circuit 306 may transmit the received electrical signal converted by the audio data to the speaker 3061, and convert the electrical signal converted by the speaker 3061 into an audio signal for output. On the other hand, the microphone 3062 converts the collected audio signal into an electrical signal, and the audio circuit 306 receives the electrical signal and converts the electrical signal into audio data, and then outputs the audio data to the processor 308 for processing, and sends the processed audio data to, for example, another device via the RF circuit 301, or outputs the audio data to the memory 302 for further processing. The audio circuitry 306 may also include an earplug jack to provide communication of the peripheral earphone with the terminal device 30.

The WiFi belongs to a short-distance wireless transmission technology, and the terminal device 30 is able to help the user to receive and send emails, browse web pages, access streaming media, etc. via the WiFi component 307. The WiFi provides the user with wireless broadband Internet access. Although the WiFi component 307 is shown in FIG. 6, it can be understood that the WiFi component 307 does not fall within the necessary component of the terminal device 30, and may be omitted as required without changing the nature of the application.

The processor 308 is a control center of the terminal device 30, connects various parts of the whole terminal device 30 by using various interfaces and lines, executes or executes a computer program and/or module stored in the memory 302, and calls data stored in the memory 302. Various functions and processing data of the terminal device 30 are executed, so as to monitor the terminal device 30 as a whole. Optionally, the processor 308 may include one or more processing cores; as at least one alternative embodiment, the processor 308 may integrate an application processor and a modem processor, where the application processor mainly processes an operating system, a user interface, an application, and the like, and the modem processor mainly processes wireless communication. It may be understood that the above modem processor may not be integrated into the processor 308.

The terminal device 30 further includes a power supply 303 (such as a battery) for supplying power to various components, and preferably, the power supply may be logically connected to the processor 308 through a power management system, so that functions such as charging, discharging, and power consumption management are managed through the power management system. The power supply 303 may also include any component of one or more direct current or alternating current power supplies, a recharging system, a power failure detection circuit, a power converter or an inverter, a power state indicator, and the like.

Although not shown, the terminal device 30 may further include a camera, a Bluetooth component, and the like, which are not described herein again. As at least one alternative embodiment, in the embodiment of the present disclosure, the output device 304 (or the input device 303) of the terminal device is a touch screen display, and the terminal device 30 further includes a memory 302, a processor 308, and one or more computer programs. One or more computer programs are stored in the memory 302, and the processor 308 is configured to call a cell registration program stored in the memory 302 (non-volatile memory) to execute each method block flow in the foregoing method embodiment, which is not described herein again.

An embodiment of the present disclosure further provides a computer storage medium, where the computer storage medium may store a program, and when the program is executed as to execute some or all of the blocks of the cell registration method described in the foregoing method embodiment.

It should be noted that, for the sake of simplicity of description, the foregoing method embodiments are described as a series of action combinations, but those skilled in the art should know that the present disclosure is not limited thereto.

For the limitations of the described order of action, due to in accordance with the present disclosure, certain blocks may be performed in other orders or simultaneously. Secondly, those skilled in the art should also know that the embodiments described in the description all fall within preferred embodiments, and the acts and modules involved are not necessarily required in the present disclosure.

In the foregoing embodiments, the description of each embodiment merely describes some parts, some of the embodiments are not described in detail, and reference may be made to relevant description of other embodiments.

In several embodiments provided herein, it should be understood that the disclosed devices may be implemented in other ways. For example, the devices embodiments described above are merely schematic. For example, division of the elements is merely a logical function division, and there may be another division manner in actual implementation. For example, a plurality of elements or components may be combined or integrated into another system, or some features may be ignored or not performed. In another point, the displayed or discussed coupling or direct coupling or communication connection to each other may be through some interfaces, indirect coupling or communication connections of devices or elements, and may be electrical or other forms.

The elements described as separate components may or may not be physically separate, and the components displayed as elements may or may not be physical elements. That is, the elements may be located in one place, or may be distributed to a plurality of network elements. Some or all of the elements may be selected according to actual needs to achieve the purpose of the solution of the present embodiment.

In addition, each functional element in each embodiment of the present disclosure may be integrated in one processing element, or each element may be physically present separately, or two or more elements may be integrated in one element. The integrated elements may be implemented in the form of hardware or in the form of software functional elements.

The integrated element may be stored in a computer readable memory when implemented in the form of a software functional element and sold or used as a separate product. Based on such understanding, the technical solutions of the present disclosure essentially or in part contributing to the related art, or all or part of the technical solutions may be embodied in the form of a software product. The computer software product is stored in a memory and includes several instructions for causing a computer device (which may be a personal computer, a server or a network device, etc.) to perform all or part of the blocks of the method described in each embodiment of the present disclosure. The memory includes: various media capable of storing program codes, such as a U disk, a read-only memory (ROM), a random access memory (RAM), a mobile hard disk, a magnetic disk, or an optical disk.

A person of ordinary skill in the art may understand that all or part of the blocks in the methods of the foregoing embodiments may be implemented by a program instructing relevant a hardware, where the program may be stored in a computer readable memory, and the memory may include: a Flash disk, a read-only memory (ROM), a Random Access Memory (RAM), a magnetic disk, or an optical disk.

The embodiments of the present disclosure have been described in detail above, and the principles and implementations of the present disclosure are set forth herein by applying specific examples, and the description of the above embodiments is merely used to help to understand the method and core idea of the present disclosure. Meanwhile, for a person of ordinary skill in the art, according to the concept of the present disclosure, changes will be made to the specific implementations and application ranges, and in summary, the contents of the present description should not be construed as limiting the present disclosure.

What is claimed is:

1. A cell registration method in a terminal device, comprising:
when receiving a paging message of a Circuit Switched FallBack (CSFB), acquiring System Information (SI3) of a first cell, the SI3 comprising a first signal strength threshold of the first cell to which the terminal device needs to reside;
registering to the first cell when a current signal strength of the first cell is less than the first signal strength threshold and greater than a preset cell resident signal strength threshold of the terminal device;

wherein the preset cell resident signal strength threshold of the terminal device is a minimum signal strength under which the terminal device is able to access and reside in a cell.

2. The method as claimed in claim 1, further comprising: initiating a Mobile Terminated call through the first cell.

3. The method as claimed in claim 1, wherein before acquiring the SI3 of the first cell, further comprising:
acquiring a signal strength list of the terminal device, the signal strength list comprising the current signal strength of the first cell, and the current signal strength of the first cell being a maximum current signal strength in the signal strength list.

4. The method as claimed in claim 3, wherein acquiring the signal strength list of the terminal device comprises:
acquiring, through a power scan, a received signal strength corresponding to a cell that is able to be detected by the terminal device;
generating the signal strength list of the terminal device according to the received signal strength corresponding to the cell that is able to be detected by the terminal device.

5. The method as claimed in claim 1, further comprising:
when the current signal strength of the first cell is less than the first signal strength threshold and less than the preset cell resident signal strength threshold of the terminal device, prohibiting, within a preset time period, the terminal device from registering to the first cell.

6. The method as claimed in claim 5, wherein the preset time period is a time period between a first time point and a second time point; and prohibiting, within the preset time period, the terminal device from registering to the first cell comprises:
adding a cell identifier of the first cell to a registration forbidden cell list of the terminal device at the first time point;
removing the cell identifier of the first cell from the registration forbidden cell list at the second time point.

7. The method as claimed in claim 1, further comprising:
when the current signal strength of the first cell is less than the first signal strength threshold and less than the preset cell resident signal strength threshold, acquiring System Information (SI3) of a second cell, the SI3 of the second cell comprising a second signal strength threshold of the second cell which the terminal device resides, and the current signal strength of the first cell being greater than a current signal strength of the second cell;
registering to the second cell when the current signal strength of the second cell is less than the second signal strength threshold and greater than the preset cell resident signal strength threshold of the terminal device.

8. The method as claimed in claim 7, further comprising: initiating a Mobile Terminated call through the second cell.

9. The method as claimed in claim 1, wherein the preset cell resident signal strength threshold is a factory setting value, or is a value calculated according to historical cell resident information of a preset cell.

10. A terminal device, comprising:
at least one processor; and
a computer readable storage, coupled to the at least one processor and storing at least one computer executable instructions thereon, which when the at least one computer executable instructions is executed by the at least one processor, cause the at least one processor to carry out following actions:
when receiving a paging message of a Circuit Switched FallBack (CSFB), acquiring System Information (SI3) of a first cell, the SI3 comprising a first signal strength threshold of the first cell to which the terminal device needs to reside;
registering to the first cell when a current signal strength of the first cell is less than the first signal strength threshold and greater than a preset cell resident signal strength threshold of the terminal device;
wherein the preset cell resident signal strength threshold of the terminal device is a minimum signal strength under which the terminal device is able to access and reside in a cell.

11. The terminal device as claimed in claim 10, further comprising:
initiating a Mobile Terminated call through the first cell.

12. The terminal device as claimed in claim 10, wherein before acquiring the SI3 of the first cell, further comprising:
acquiring a signal strength list of the terminal device, the signal strength list comprising the current signal strength of the first cell, and the current signal strength of the first cell being a maximum current signal strength in the signal strength list.

13. The terminal device as claimed in claim 12, wherein acquiring the signal strength list of the terminal device comprises:
acquiring, through a power scan, a received signal strength corresponding to a cell that is able to be detected by the terminal device;
generating the signal strength list of the terminal device according to the received signal strength corresponding to the cell that is able to be detected by the terminal device.

14. The terminal device as claimed in claim 10, further comprising:
when the current signal strength of the first cell is less than the first signal strength threshold and less than the preset cell resident signal strength threshold of the terminal device, prohibiting, within a preset time period, the terminal device from registering to the first cell.

15. The terminal device as claimed in claim 14, wherein the preset time period is a time period between a first time point and a second time point; and prohibiting, within the preset time period, the terminal device from registering to the first cell comprises:
adding a cell identifier of the first cell to a registration forbidden cell list of the terminal device at the first time point;
removing the cell identifier of the first cell from the registration forbidden cell list at the second time point.

16. The terminal device as claimed in claim 10, further comprising:
when the current signal strength of the first cell is less than the first signal strength threshold and less than the preset cell resident signal strength threshold, acquiring System Information (SI3) of a second cell, the SI3 of the second cell comprising a second signal strength threshold of the second cell which the terminal device resides, and the current signal strength of the first cell being greater than a current signal strength of the second cell;
registering to the second cell when the current signal strength of the second cell is less than the second signal strength threshold and greater than the preset cell resident signal strength threshold of the terminal device.

17. The terminal device as claimed in claim 16, further comprising:
   initiating a Mobile Terminated call through the second cell.

18. The terminal device as claimed in claim 10, wherein the preset cell resident signal strength threshold is a factory setting value, or is a value calculated according to historical cell resident information of a preset cell.

19. A non-transitory computer-readable storage medium, on which a computer program is stored, wherein the computer program is executed by a processor to carry out following actions:
   when receiving a paging message of a Circuit Switched FallBack (CSFB), acquiring System Information (SI3) of a first cell, the SI3 comprising a first signal strength threshold of the first cell to which a terminal device needs to reside;

registering to the first cell when a current signal strength of the first cell is less than the first signal strength threshold and greater than a preset cell resident signal strength threshold of the terminal device;

wherein the preset cell resident signal strength threshold of the terminal device is a minimum signal strength under which the terminal device is able to access and reside in a cell.

20. The non-transitory computer-readable storage medium as claimed in claim 19, wherein before acquiring the SI3 of the first cell, further comprising:
   acquiring a signal strength list of the terminal device, the signal strength list comprising the current signal strength of the first cell, and the current signal strength of the first cell being a maximum current signal strength in the signal strength list.

* * * * *